United States Patent
Brunnecker

(10) Patent No.: US 11,673,342 B2
(45) Date of Patent: Jun. 13, 2023

(54) METHOD FOR WELDING A CONNECTION BETWEEN A FIRST JOINING SURFACE OF A FIRST MOLDED PART AND A SECOND JOINING SURFACE OF A SECOND MOLDED PART

(71) Applicant: EVOSYS LASER GMBH, Erlangen (DE)

(72) Inventor: Frank Brunnecker, Memmelsdorf (DE)

(73) Assignee: EVOSYS LASER GMBH, Erlangen (DE)

( * ) Notice: Subject to any disclaimer, the term of this patent is extended or adjusted under 35 U.S.C. 154(b) by 504 days.

(21) Appl. No.: 15/999,775

(22) PCT Filed: Feb. 21, 2017

(86) PCT No.: PCT/EP2017/053868
§ 371 (c)(1),
(2) Date: Aug. 20, 2018

(87) PCT Pub. No.: WO2017/144439
PCT Pub. Date: Aug. 31, 2017

(65) Prior Publication Data
US 2020/0164594 A1  May 28, 2020

(30) Foreign Application Priority Data
Feb. 22, 2016  (DE) .................... 10 2016 103 060.0

(51) Int. Cl.
*B29C 65/16* (2006.01)
*B29C 65/78* (2006.01)
*B29C 65/00* (2006.01)

(52) U.S. Cl.
CPC ...... *B29C 65/1638* (2013.01); *B29C 65/1609* (2013.01); *B29C 65/1616* (2013.01);
(Continued)

(58) Field of Classification Search
CPC ............ B29C 65/1638; B29C 65/1609; B29C 65/1616; B29C 65/1661; B29C 65/1664;
(Continued)

(56) References Cited

U.S. PATENT DOCUMENTS 6,369,351 B1   4/2002  Hesener
8,075,725 B2 * 12/2011 Hofmann ............... B23K 26/18
                                                156/272.8
(Continued)

FOREIGN PATENT DOCUMENTS

EP     1575756 A1   9/2005
JP   2005-000955 A   1/2005
(Continued)

OTHER PUBLICATIONS

"Galvanometer Opical Scanners Information" (https://www.globalspec.com/learnmore/optics_optical_components/optoelectronics/optical_scanners), accessed Jun. 7, 2021.*
Machine Translation of the Description of Hamamtsu Photonics KK, JP2005001172A published Jan. 6, 2005 that was made of record by Applicant in the IDS filed Aug. 20, 2018 (but included only a translation of the Abstract). (Year: 2023).*

*Primary Examiner* — Cynthia L Schaller
(74) *Attorney, Agent, or Firm* — Manabu Kanesaka

(57) ABSTRACT

The invention relates to a method for welding a connection between a first joining surface of a first molded part and a second joining surface of a second molded part, which by means of a clamping device are moved and braced with their joining surfaces in contact with one another, wherein the first molded part is at least partially transparent for a primary beam of a first radiation source and at least partially absorbent for a secondary beam of a second radiation source, and the second molded part is at least partially absorbent for the primary beam, wherein sequentially the second molded part
(Continued)

Figure 1:
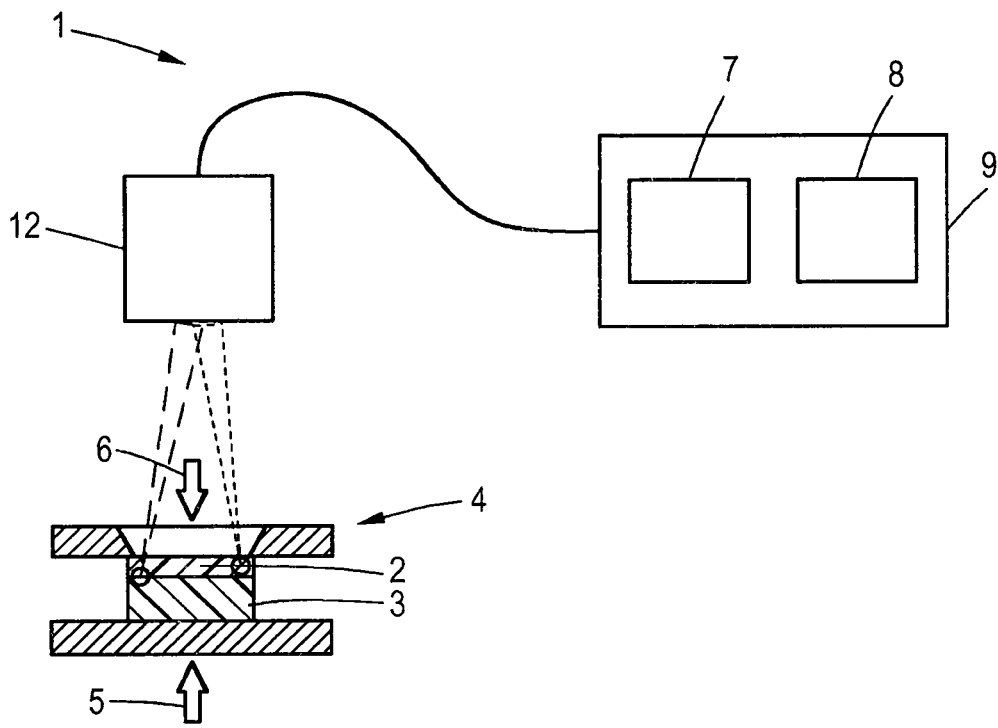

is irradiated with the primary beam and the first molded part is irradiated with the secondary beam.

14 Claims, 2 Drawing Sheets

(52) U.S. Cl.
CPC ...... *B29C 65/1661* (2013.01); *B29C 65/1664* (2013.01); *B29C 65/7841* (2013.01); *B29C 66/114* (2013.01); *B29C 66/24244* (2013.01); *B29C 66/73921* (2013.01); *B29C 66/91645* (2013.01)

(58) Field of Classification Search
CPC ............... B29C 65/7841; B29C 66/114; B29C 66/24244; B29C 66/73921; B29C 66/91645; B29C 65/1429; B29C 65/1409; B29C 66/83221; B29C 66/91951; B29C 66/112; B29C 66/53461; B29C 65/1635; B29C 65/1629; B29C 65/1464; B29C 65/1416

See application file for complete search history.

(56) References Cited

U.S. PATENT DOCUMENTS

| | | | |
|---|---|---|---|
| 2002/0050153 A1* | 5/2002 | Schultz | B23K 26/0608 65/377 |
| 2005/0041893 A1 | 2/2005 | Hartmann et al. | |
| 2011/0288220 A1* | 11/2011 | Benten | B29C 66/71 524/424 |
| 2015/0273624 A1* | 10/2015 | Yoshida | B32B 7/05 428/209 |

FOREIGN PATENT DOCUMENTS

| | | |
|---|---|---|
| JP | 2005-001172 A | 1/2005 |
| WO | 03/029109 A2 | 4/2003 |
| WO | 2004/058485 A1 | 7/2004 |

* cited by examiner

METHOD FOR WELDING A CONNECTION BETWEEN A FIRST JOINING SURFACE OF A FIRST MOLDED PART AND A SECOND JOINING SURFACE OF A SECOND MOLDED PART

RELATED APPLICATIONS

The present application is National Phase of International Application No. PCT/EP2017/053868 filed Feb. 21, 2017, and claims priority from German Application No. 10 2016 103 060.0, filed Feb. 22, 2016, the disclosure of which is hereby incorporated by reference herein in its entirety.

The invention relates to a method for welding a connection between a first joining surface of a first molded part and a second joining surface, which by means of a clamping device are moved and braced with their joining surfaces in contact with one another, wherein the first molded part is at least substantially transparent for a primary beam of a first radiation source and at least partially absorbent for a secondary beam of a second radiation source, and the second molded part is at least partially absorbent for the primary beam, wherein sequentially chronologically one after the other and in alternation the second molded part is irradiated with the primary beam and the first molded part is irradiated with the secondary.

Welding methods of this kind are known in the prior art and are used in particular for the joining of plastics materials, for example thermoplastics. Here, the two molded parts are arranged one above the other and are brought into contact with one another and are braced against one another by means of a clamping device, such that during the welding process the joining surfaces of the two molded parts are in contact and can be welded. in the case of what is known as a "through-welding method" or "laser through-welding method", the first molded part is arranged above the second molded part and with respect to the beam paths is thus arranged closer to the first radiation source and the second radiation source. Since the first molded part is transparent for the primary beam, this beam can penetrate the first molded part such that the primary beam is firstly absorbed in the second molded part and heats said molded part. Within the scope of this application, the term "at least partially transparent" or "at least partially absorbent" is understood to mean that the corresponding molded part is for the most part transparent or absorbent for the associated beam. Of course, a partially transparent material is always absorbent to a certain degree and a partially absorbent material is also partially transparent.

By means of the absorption of the primary beam, the second molded part is heated such that a state of fusion is produced in the region of the second molded part. By heating the second molded part, the first molded part is also heated at the joining surface thereof by means of heat conduction. Since the heating of the second molded part occurs in this case merely as a result of heat conduction, higher process times result. In the prior art, the simultaneous irradiation of the first molded part with the secondary beam of a second radiation source is therefore proposed in order to heat the first molded part likewise independently of the primary beam, i.e. independently of the heating of the second molded part.

A method having the features of the preamble of claim 1 is known from document JP 2005-000955 A. In the method described there, two lasers are used, wherein one laser beam is provided for the welding method and the other laser is provided for the quality control of the produced welded connection.

Document JP 2005-001172 A proposes a method in which two components are connected to one another by means of a cross-shaped weld seam. In a first step weld seams are produced which extend transversely to the contact surfaces of the two components. In a second step a weld seam is produced along the contact surface.

Document U.S. Pat. No. 6,369,351 B1 likewise describes a laser welding method in which laser radiation with two different wavelengths is used.

Document EP 1 575 756 B1 discloses a method and an apparatus for the contour welding of three-dimensional molded parts. There, the first molded part is irradiated with an electromagnetic secondary beam simultaneously to the irradiation of the second molded part by the primary beam, such that the temperature field in the welding zone is homogenized. Consequently, the heating of the first molded part is achieved not only by the heat conduction from the second molded part, but the secondary beam is absorbed primarily in the first molded part, such that it heats the first molded part.

In the case of the known welding method, the secondary beam however always penetrates through the first molded part and is only then absorbed in the second molded part. This is usually a significant proportion of the irradiated secondary beam, such that with simultaneous irradiation the energy of the two radiation sources has to be reduced in order to prevent an overheating of the second molded part. The overall duration of the process is made longer as a result of the reduction of the energy of the two radiation sources.

The object of the invention is therefore to specify a welding method in which the process time is reduced.

In order to solve this problem, it is provided in accordance with the invention in a method of the kind described at the outset that a first focus of the primary beam lies on the second joining surface and a second focus of the secondary radiation lies within the volume of the first molded part.

In accordance with the invention it is advantageously achieved that each radiation source can be used with its maximum possible energy and can irradiate this into the first or the second molded part, such that the process duration can be reduced compared to the known welding methods. In particular, sequential irradiation by the primary beam and the secondary beam of the first and second molded part is essential for this purpose. It can thus be prevented that the second molded part is heated merely by heat conduction from the first molded part or by radiation of the first molded part by the primary beam. It is also avoided that the irradiated secondary beam, which heats the first molded part, leads to an overheating of the second molded part. By means of the sequential, alternating irradiation, it is possible to heat the first molded part and the second molded part more selectively, such that irradiation with the maximum energy of each radiation source can be implemented and the welding method thus can be performed particularly efficiently.

The term "sequentially" used in this application is to be understood such that the irradiation processes with the primary beam and the secondary beam are performed chronologically one after the other and therefore in alternation. The term is not to be understood, however, in the sense of "continuously".

The method according to the invention provides that a first focus of the primary beam lies on the second joining surface and a second focus of the secondary beam lies within the volume of the first molded part. The primary beam can therefore be focused preferably on the second joining surface, such that the energy of the primary beam is deposited substantially on the second joining surface, that is to say the surface of the second molded part facing towards the first joining surface, that is to say the lower surface of the first molded part. The secondary beam is preferably focused within the volume of the first molded part, such that the first molded part is heated over a large area.

In the method according to the invention, a monochromatic beam is particularly preferably used as primary beam and a polychromatic beam is particularly preferably used as secondary beam. The first radiation source, which radiates the primary beam, consequently can be formed preferably as a laser. The secondary beam can be formed for example as a broadband radiation source, for example as a halogen lamp. The secondary beam of the broadband radiation source is preferably absorbed in the first molded part, wherein the monochromatic primary beam is absorbed in a surface-near layer of the second molded part. By means of the sequential irradiation with the primary beam and the secondary beam, both the first molded part and the second molded part consequently can be heated, such that a temperature gradient is provided that is less steep than in the case of conventional methods, for example conventional laser through-welding, in which the energy of the primary beam is deposited in the second molded part and the first molded part is heated merely by heat conduction. Here, a large temperature gradient forms between the first molded part and the second molded part, which on the one hand is reflected in a longer process time and can cause the decomposition temperature of the material of the second molded part to be exceeded in the second molded part.

A development of the method according to the invention can also lie in that laser radiation is used as primary beam or as primary beam and as secondary beam. It is particularly preferred here that laser radiation is used both as primary beam and as secondary beam. The first and the second radiation source can therefore be lasers which for example differ in respect of their wavelengths. It is also possible to use a broadband radiation source as secondary beam and to use a laser as primary beam.

In the method according to the invention it is particularly preferably provided that the wavelength of the primary beam and/or the wavelength of the secondary beam lies in a first range of from 500 to 1100 nm or in a second range of from 900 to 2400 nm. Of course, the wavelength of the two radiation sources used for the method according to the invention can be coordinated arbitrarily with a specific application, in particular with material properties of the two molded parts.

The method according to the invention can also be developed insofar as a control device switches the primary beam on and off depending on a first parameter and switches the secondary beam on and off depending on a second parameter. A first parameter therefore determines when the primary beam is switched on and switched off, and the second parameter determines or defines when the secondary beam is switched on and switched off. Consequently, by means of the first and the second parameter, it is possible to control how the sequence in which the primary beam and the secondary beam are switched on and off in alternation proceeds. Within the scope of this application, a sequential switching on and off is understood to mean that either the primary beam or the secondary beam is switched on and the other beam is switched off. A sequence of the irradiation thus consists of an interval within which the primary beam is switched on and the secondary beam is switched off, followed by an interval in which the primary beam is switched off and the secondary beam is switched on, or vice versa.

Here, it can be provided particularly preferably that the primary beam and the secondary beam are switched on and off in alternation in at least two sequences. Of course, it is possible to perform an arbitrary number of sequences in succession, such that the changing between the primary beam and the secondary beam or the switch-on and switch-off times thereof can be adjusted arbitrarily. In particular, the switch-on-time and switch-off time of the primary beam can deviate from the secondary beam. Furthermore, the switch-on-time and switch-off time of the primary beam and of the secondary beam in each of the successive sequences can be of different lengths. Further parameters, such as the intensity of the primary beam and/or the secondary beam, the writing speed of the primary beam and/or the secondary beam can be defined arbitrarily for each switch-on and switch-off time. A number of sequences consequently can be performed in succession, in which on the one hand the aforesaid parameters between the primary beam and the secondary beam differ and on the other hand the parameters can vary from sequence to sequence.

In accordance with this embodiment of the method according to the invention, it can also preferably be provided that the first parameter and/or the second parameter and/or a writing speed of the primary beam and/or of the secondary beam and/or an intensity of the primary beam and/or the secondary beam is or are defined in such a way that the energy input by the irradiation in the first and in the second molded part is greater than the energy discharge by heat conduction. Consequently, it is advantageously possible to control that more energy is deposited in the first molded part and second molded part by the irradiation than is lost or dissipated by the heat conduction. Here, the writing speed is understood to mean the speed of movement of the beam or the speed of movement of the focus of the beam along the contour that is to be welded. A high writing speed thus means that the beam moves more quickly over the contour that is to be welded, or the beam is guided quickly over the contour that is to be welded. In the case of a lower writing speed the beam or focus thereof resides for longer on a portion of the contour than in the case of a higher writing speed.

In this embodiment of the method according to the invention it is particularly preferred that a minimum value of the energy input is defined in the first and/or in the second molded part in such a way that a state of fusion of the first and/or the second joining surface is maintained. It is thus ensured that the energy input is selected to be minimal, in such a way that an achieved state of fusion is maintained and welding of the two molded parts is thus made possible. Of course, the energy input drops below this minimal value once the welding process is complete, such that the fused joining surfaces of the two molded parts cool and can thus be connected to one another. Here, it is particularly preferably provided that the first and/or the second molded part are/is mounted movably in such a way that the extents or dimensions of the two molded parts during the state of fusion change by a defined length difference as a result of the fusing. To this end, the clamping device is preferably mounted or formed in such a way that a change in shape of the two molded parts is made possible under the effect of the clamping force. The resultant change in length can consequently be used to control the process. Consequently, the state of fusion can be maintained in a path-controlled manner, such that once a certain length and/or change in length has been reached or once a certain path has been travelled, the beam is switched off, such that the two molded parts fuse with one another. Alternatively, the process can be performed in a time-controlled manner, such that the beam is switched off once a certain time has passed. In both variants a time evaluation or a path evaluation can be performed accordingly. The change in shape resulting from the fusion process is preferably used consequently as a control parameter for the method according to the invention.

In addition, a maximum value of the energy input can be defined particularly preferably in such a way that a decomposition temperature of the first and/or the second molded part is not reached. It is thus ensured that the energy introduced by the irradiation of the first and second molded parts into the material does not cause the first and second molded part to be damaged as a result of their decomposition temperature being exceeded. In particular by means of the sequential irradiation of the first and second molded part with the primary beam and the secondary beam in alternation, provided in accordance with the invention, it is achieved that the first molded part is heated by the secondary beam, such that the heating is not performed exclusively via heat conduction and therefore heating of the second molded part above the decomposition temperature can be eliminated.

A preferred development of the method according to the invention provides that a galvanometer scanner is used as movement system. By means of a mirror moved by means of a galvanometer, high writing speeds can thus be achieved, such that the primary beam can be guided particularly speedily over the contour that is to be welded.

Figure 2:
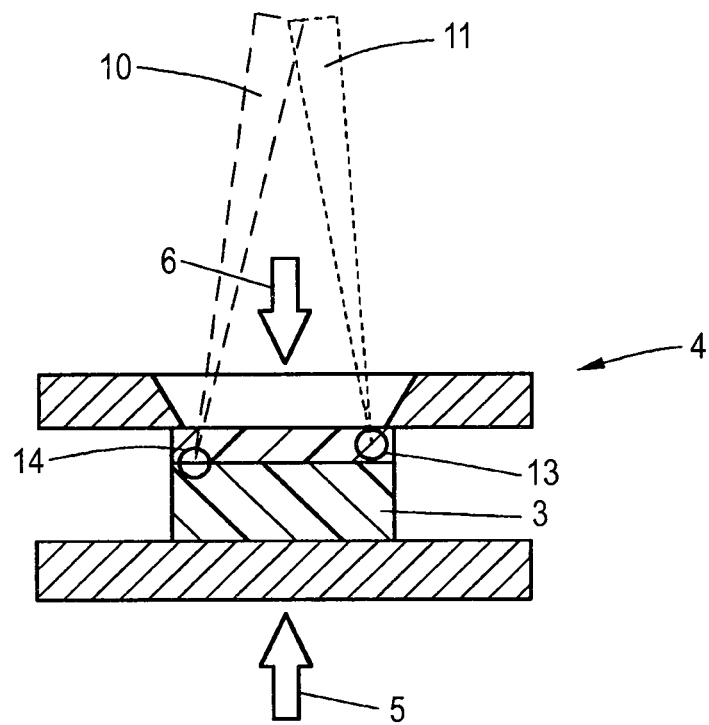
Figure 3:
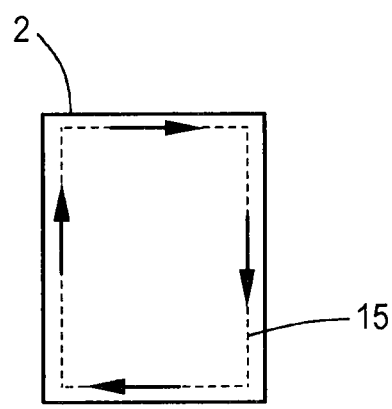

The invention will be explained in greater detail hereinafter on the basis of exemplary embodiments with reference to the drawings. The drawings are schematic illustrations and show:

FIG. 1 an apparatus which is suitable for carrying out the method according to the invention;

FIG. 2 a detail of the apparatus according to the invention of FIG. 1;

FIG. 3 a welding contour at a joining surface of a molded part; and

Figure 4:
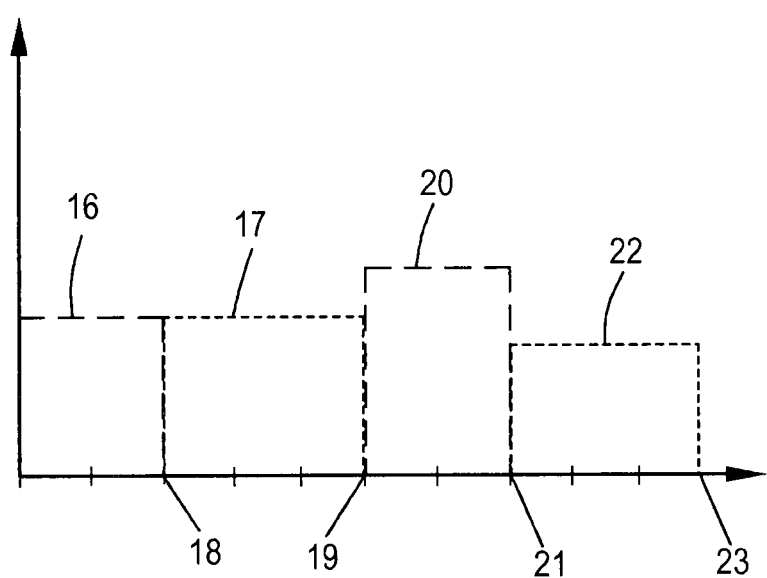

FIG. 4 an energy/time graph.

FIG. 1 shows an apparatus 1 for welding a connection between a first molded part 2 and a second molded part 3. Both molded parts 2, 3 are thermoplastics. The apparatus 1 comprises a clamping device 4, which is designed to bring both molded parts 2, 3 into abutment with one another and to brace them. The bracing is illustrated schematically by the arrows 5, 6. The apparatus 1 also comprises two radiation sources 7, 8, which are arranged in a common housing 9. The first radiation source 7 here emits a primary beam 10, and the second radiation source 8 emits a secondary beam 11 (see FIG. 2).

In this exemplary embodiment the radiation sources 7, 8 are formed as individual radiation sources which are each equipped with a laser, which emit in different wavelength ranges. The two radiation sources 7, 8 can be controlled separately from one another in respect of their emission and intensity. A movement system 12, in this case a galvanometer scanner, is also shown, in which the beam of the two radiation sources 7, 8 is guided.

The first molded part 2 is transparent for the primary beam 10, such that said beam can radiate through the first molded part 2 and can be absorbed in the second molded part 3. The second molded part 3 absorbs the primary beam 10 in a surface-near layer. The secondary beam 11 is absorbed by the first molded part 2, such that the first molded part 2 can be heated by the irradiation with the secondary beam 11. The first molded part 2 and the second molded part 3 can be irradiated sequentially with the primary beam 10 and the secondary beam 11 with appropriate control of the radiation sources 7, 8. The two molded parts 2, 3 are therefore irradiated chronologically in succession and therefore alternately with the primary beam 10 and the secondary beam 11.

FIG. 2 shows a detail of the apparatus 1 from FIG. 1. As can be seen, the secondary beam 11 is deposited in the first molded part 2, in particular in the volume thereof. A focus 13 of the secondary beam 11 thus lies in the volume of the first molded part 2. The primary beam 10 has a focus 14 which lies in the surface-near layer in the second molded part 3, such that the joining surface of the second molded part 3, which faces towards the first molded part 2, is heated selectively.

FIG. 3 shows an exemplary processing contour of the first molded part 2 and of the second molded part 3 from above, that is to say as considered from the movement system 12. The primary beam 10 and the secondary beam 11 are guided with high writing speeds along a shown contour 15 and are switched on with freely selectable alternation over time with freely selectable intensities. This results in selective and speedy heating of the two molded parts 2, 3 at their joining surfaces.

FIG. 4 shows an energy/time graph for an exemplary welding process. Here, the time is plotted on the abscissa and the energy of the particular radiation source 7, 8 or of the primary beam 10 and the secondary beam 11 is plotted on the ordinate. The energy of the primary beam 10 is provided in a first interval with reference sign 16, and the energy of the secondary beam 11 is provided in a second interval with reference sign 17. It can be seen that the two molded parts 2, 3 are irradiated sequentially by the primary beam 10 and a secondary beam 11. At the start of the welding process the primary beam 10 is firstly switched on, which is shown by the energy value 16. The secondary beam 11 is switched off at this time. At a time 18, the primary beam 10 is switched off and the secondary beam 11 is switched on, which is indicated in the graph by the energy value 17 of the secondary beam 11. At a time 19, the secondary beam 11 is switched off and the primary beam 10 is switched on again, but with a higher intensity, which leads to an increased energy value 20 of the primary beam 10 relative to the energy value 16. At a time 21, the primary beam 10 is then switched off again and the secondary beam 11 is switched on again, but with a lower intensity than between the times 18 and 19, such that an energy value 22 lower than the energy value 17 is provided. At a time 23, the secondary beam 11 is switched off, such that the joining surfaces of the two molded parts 2, 3 cool and can be connected to one another.

Due to the reciprocal (alternating) switching on and off of the primary beam 10 and of the secondary beam 11, these can be operated with higher energies compared to conventional welding methods, since the energy of the two radiation sources 7, 8, i.e. of the primary beam 10 or secondary beam 11, can be deposited in each case selectively in one of the two molded parts 2, 3. Excessive energy is thus prevented from being introduced into the second molded part 3 simultaneously by the primary beam 10 and the secondary beam 11 and thus damaging said second molded part.

The invention claimed is:

1. A method for welding a connection between a first joining surface of a first molded part and a second joining surface of a second molded part disposed under the first molded part, comprising:

preparing the first molded part to be at least partially transparent for a primary beam of a first radiation source and at least partially absorbent for a secondary beam of a second radiation source, and the second molded part to be at least partially absorbent for the primary beam;

moving and bracing the first molded part and the second molded part by a clamping device with the first and second joining surfaces in contact with one another; and sequentially and chronologically irradiating a region that includes a first focus of the primary beam on the second joining surface and a second focus of the secondary beam within a volume of the first molded part, so that when the primary beam is on, the secondary beam is off, and visa-verse such that the region receives radiation in a manner wherein radiation is either being emitted by the primary beam or the secondary beam.

2. The method according to claim 1, wherein a monochromatic beam is used as the primary beam and a polychromatic beam is used as the secondary beam.

3. The method according to claim 1, wherein laser radiation is used as the primary beam or as the primary beam and as the secondary beam.

4. The method according to claim 1, wherein a wavelength of the primary beam and/or a wavelength of the secondary beam lies in a first interval of 500-1100 nm or in a second interval of 900-2400 nm.

5. The method according to claim 1, wherein a control device switches the primary beam on and off depending on a first parameter and switches the secondary beam on and off depending on a second parameter.

6. The method according to claim 5, wherein the primary beam and the secondary beam are switched on and off in alternation in at least two sequences.

7. The method according to claim 5, wherein the first parameter and/or the second parameter and/or a writing speed of the primary beam and/or of the secondary beam and/or an intensity of the primary beam and/or of the secondary beam is or are defined in such a way that an energy input by an irradiation in the first and in the second molded part is greater than an energy discharge by heat conduction.

8. The method according to claim 7, wherein a minimum value of the energy input in the first and/or in the second molded part is defined in such a way that a state of fusion of the first and/or of the second joining surface is maintained.

9. The method according to claim 7, wherein a maximum value of the energy input in the first and/or in second molded part is defined in such a way that a decomposition temperature of the first and/or of the second molded is not reached.

10. The method according to claim 8, wherein the first and/or the second molded part is mounted movably in such a way that the first and second molded parts are fused by a defined path during the state of fusion.

11. The method according to claim 1, wherein a galvanometer scanner is used as a movement system of the primary and secondary beams.

12. The method according to claim 1, wherein the primary beam and the secondary beam are guided with writing speeds along a contour in the area with the first focus and the second focus and are switched on with selectable alternation over time with selectable intensities.

13. The method according to claim 1, wherein the primary beam and the secondary beam are switched on and off in alternation in at least two sequences.

14. The method according to claim 13, wherein the primary beam irradiates in a first interval with one intensity, the secondary beam irradiates in a second interval with the one intensity, the primary beam irradiates in a third interval with an intensity higher than said one intensity, and then the secondary beam irradiates in a fourth interval with an intensity lower than said one intensity.

* * * * *